United States Patent [19]
Fujimori et al.

[11] Patent Number: 5,368,965
[45] Date of Patent: Nov. 29, 1994

[54] ELECTROPHOTOGRAPHIC PHOTORECEPTOR

[75] Inventors: Mizue Fujimori; Ken Nagasawa; Yorinobu Yamada, all of Saitama, Japan

[73] Assignee: Citizen Watch Co., Ltd., Tokyo, Japan

[21] Appl. No.: 52,781

[22] Filed: Apr. 23, 1993

[30] Foreign Application Priority Data

| Apr. 24, 1992 | [JP] | Japan | 4-131601 |
| May 29, 1992 | [JP] | Japan | 4-161639 |
| Jun. 5, 1992 | [JP] | Japan | 4-171783 |
| Feb. 5, 1993 | [JP] | Japan | 5-040667 |
| Feb. 5, 1993 | [JP] | Japan | 5-040668 |
| Feb. 5, 1993 | [JP] | Japan | 5-040669 |
| Feb. 5, 1993 | [JP] | Japan | 5-040670 |

[51] Int. Cl.$^5$ .................. G03G 5/06; G03G 5/043
[52] U.S. Cl. .................. 430/57; 430/58; 430/74; 430/78
[58] Field of Search .................. 430/57, 58, 74, 78

[56] References Cited

U.S. PATENT DOCUMENTS

| 4,443,528 | 4/1984 | Iamura et al. | 430/78 X |
| 4,983,483 | 1/1991 | Tsai | 430/74 X |

*Primary Examiner*—Roland Martin
*Attorney, Agent, or Firm*—Flynn, Thiel, Boutell & Tanis

[57] ABSTRACT

An electrophotographic photoreceptor comprises an α-form copper phthalocyanine composition, which is obtained by treating a copper tetranitrophthalocyanine and copper phthalocyanine simultaneously to convert the crystalline form into α-form, and a photoconductive squarylium compound as the photoconductive material, and the ratios of the copper tetranitrophthalocyanine and the squarylium compound to the α-form copper phthalocyanine composition are limited to a particular range. The photoreceptor has a high photosensitivity and an excellent durability.

24 Claims, 3 Drawing Sheets

ELECTROPHOTOGRAPHIC PHOTORECEPTOR

BACKGROUND OF THE INVENTION

This invention relates to an electrophotographic photoreceptor wherein an α-form copper phthalocyanine composition composed of a copper tetranitrophthalocyanine and copper phthalocyanine having a specific structure, and a photoconductive squarylium compound are used as a photoconductive material.

Electrophotographic photoreceptors presently used are mostly of a functionally separating type containing a charge generation material having photosensitivity at a wavelength of a light source and a charge transport material having a high charge transport rate. The charge generation material is a photoconductive material, such as an azo pigment, a perylene pigment or a phthalocyanine pigment or the like, and the charge transport material is a hydrazone compound, a styryl compound, a pyrazoline compound, a triphenylamine compound or the like.

On the other hand, there are single layer-type photoreceptors wherein a pigment having photosensitivity at a wavelength of a light source is dispersed in a binder resin, and the photoconductive material is an azo pigment, a quinacridone pigment, a perylene pigment, an anthraquinone pigment, a phthalocyanine pigment or the like.

The above photoreceptors using copper phthalocyanine as the photoconductive material have some problems, such as low sensitivity or sensitivity deviation or decrease in charge acceptance caused by repeated use.

Besides, due to the variety of information, it has been required to express copiers and printers not in monochromatic but multi or full color. There are some means to express a full color in electrophotographic processes. In the case of using filters or toners as the filters, a photoreceptor is necessary to be a panchromatic one having a sensitivity over the whole visible light region. However, no photoreceptor has been completed yet which satisfies both spectral sensitivity and light decay rate.

SUMMARY OF THE INVENTION

An object of the invention is to provide an electrophotographic photoreceptor having a panchromatic photosensitivity, a high photosensitivity and an excellent durability which uses copper phthalocyanine as a photoconductive material.

The present invention provides an electrophotographic photoreceptor which has achieved the above object, and comprises an α-form copper phthalocyanine composition, obtained by treating a copper tetranitrophthalocyanine (A) having the formula I and copper phthalocyanine simultaneously to convert the crystalline form into α-form, and a photoconductive squarylium compound as the photoconductive material, the ratio of the copper tetranitrophthalocyanine (A) to the α-form copper phthalocyanine composition being 2 wt. % to 20 wt. %, and the ratio of the squarylium compound to the α-form copper phthalocyanine composition being 1 wt. % to 30 wt. %.

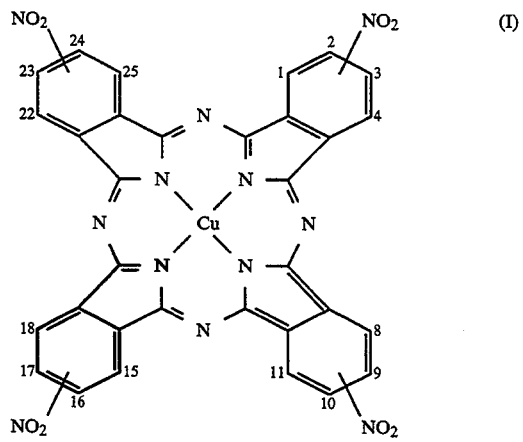

In the formula, each one nitro group is substituted at the 1-position or 4-position, 8-position or 11-position, 15-position or 18-position, and 22-position or 25-position, respectively.

The present invention provides another electrophotographic photoreceptor which also has achieved he above object, and comprises an α-form copper phthalocyanine composition, obtained by treating a copper tetranitrophthalocyanine (B) having the formula I and copper phthalocyanine simultaneously to convert the crystalline form into α-form, and a photoconductive squarylium compound as the photoconductive material, the ratio of the copper tetranitrophthalocyanine (B) to the α-form copper phthalocyanine composition being 1 wt. % to 10 wt. %, and the ratio of the squarylium compound to the α-form copper phthalocyanine composition being 1 wt. % to 30 wt. %. In the above formula (I), each one nitro group is substituted at the 2-position or 3-position, 9-position or 10-position, 16-position or 17-position, and 23-position or 24-position, respectively.

The present invention provides a further electrophotographic photoreceptor which also has achieved the above object, and comprises an α-form copper phthalocyanine composition, obtained by treating a copper tetranitrophthalocyanine (A) and a copper tetranitrophthalocyanine (B) having the formula I and copper phthalocyanine simultaneously to convert the crystalline form into α-form, and a photoconductive squarylium compound as the photoconductive material, the ratio of the copper tetranitrophthalocyanine (A) to the α-form copper phthalocyanine composition being not more than 15 wt. %, the ratio of the copper tetranitrophthalocyanine (B) being not more than 8 wt. %, the ratio of the sum of the copper tetranitrophthalocyanine (A) and the copper tetranitrophthalocyanine (B) to the α-form copper phthalocyanine composition being not more than 20 wt. %, and the ratio of the squarylium compound to the α-form copper phthalocyanine composition being 1 wt. % to 30 wt. %.

Figure 1:
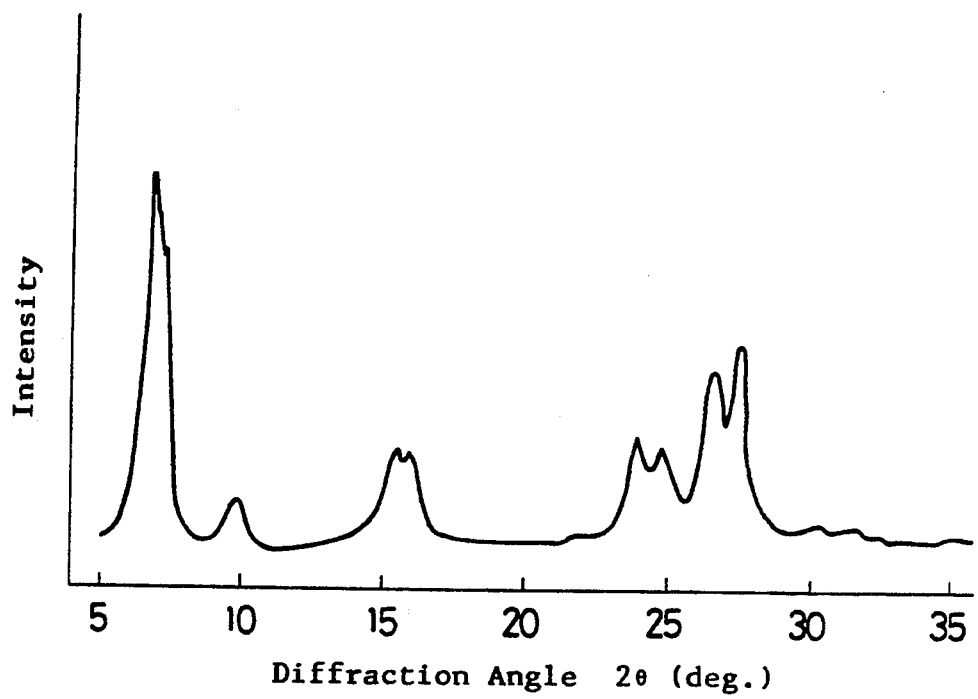
FIG. 1 shows a X-ray diffraction pattern of an α-form copper phthalocyanine composition used in the invention.

1 ... Conductive substrate
2 ... Photosensitive layer
3 ... First photosensitive layer
4 ... Second photosensitive layer
5 ... Charge generation layer
6 ... Charge transport layer

DETAILED DESCRIPTION OF THE INVENTION

Preferred forms of the electrophotographic photoreceptor of the invention are single layers alone of the photosensitive layer, laminates of a first photosensitive layer containing a pigment and a second photosensitive layer containing the α-form copper phthalocyanine composition and the photoconductive squarylium compound laminated thereonto, and laminates of a charge generation layer containing the α-form copper phthalocyanine composition and the photoconductive squarylium compound, and a charge transport layer.

In the electrophotographic photoreceptor of the invention, the photosensitivity can be changed by changing the ratio of copper tetranitrophthalocyanine (A) and/or (B) to copper phthalocyanine composition. In the case that the ratio of the copper tetranitrophthalocyanine (A) and/or (B) is less than the aforementioned range, photosensitivity is insufficient as the photoreceptor. On the other hand, in the case that the ratio is more than the aforementioned range, charge acceptance is insufficient. A preferable range is 3 to 15 wt. % in the case of the copper tetranitrophthalocyanine (A) and 0.2 to 4 wt. % in the case of the copper tetranitrophthalocyanine (B). In the case of a combination of the copper tetranitrophthalocyanines (A) and (B), a preferable range is 1 to 10 wt. % of the copper tetranitrophthalocyanine (A) and 0.1 to 2 wt. % of the copper tetranitrophthalocyanine (B).

Copper phthalocyanine and copper tetranitrophthalocyanines (A) and (B) can be prepared according to a known synthesis of copper phthalocyanine, such as disclosed in GB 464126, GB 476243, J. Coord. Chem., 19(4), 295–301, 1989 or the like.

The α-form copper phthalocyanine composition can be prepared by the acid pasting method, the acid slurry method, the low temperature sublimation method or the like. In the invention, it is important that copper tetranitrophthalocyanine is uniformly distributed throughout the α-form copper phthalocyanine crystals in the α-form copper phthalocyanine composition, and in this regard, the acid pasting method is the most preferable. In the acid pasting method, phthalocyanine (copper phthalocyanine and copper tetranitrophthalocyanine) is dissolved in sulfuric acid, and the sulfuric acid solution is poured into an excess of water to convert the crystalline form to α-form. The photoreceptor properties in the invention cannot be obtained by the mere mixing of copper tetranitrophthalocyanine with α-form copper phthalocyanine.

An X-ray diffraction pattern of the α-form copper phthalocyanine composition used in the invention is shown in FIG. 1. As the crystalline forms of copper phthalocyanine, there are α-form, β-form, χ-form and τ-form. In the case of α-form diffraction peaks appear at diffraction angles (2θ) of 6.5°, 7.0°, 9.7°, 15.2°, 15.9°, 23.7°, 24.8°, 26.4° and 27.3°, and accordingly, it can be seen from the diffraction patterns of FIG. 1 that the copper phthalocyanine composition of the invention belongs to α-form.

Photoconductive squarylium compounds usable in the invention include the compounds having the following formula.

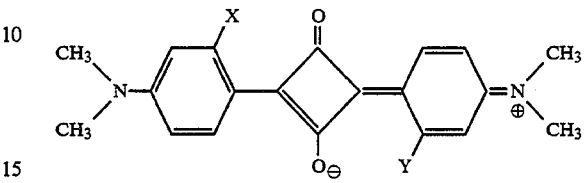

In the formula, X and Y are identical with or different from each other, and represent hydrogen atom, fluorine atom, hydroxyl group, alkyl group, and alkoxy group.

A suitable ratio of the squarylium compound to the α-form copper phthalocyanine composition is 1 wt. % to 30 wt. %, preferably 2 wt. % to 15 wt. %, in order to obtain a preferable spectral sensitivity and durability.

The squarylium compound can be synthesized according to the disclosure in Synthesis. 961 (1980), Angew. Chem. Int. Ed. Engl. 7:530 (1968) or the like.

The photoconductive squarylium compound obtained through conventional purification processes is usable in this invention. It is preferable that the squarylium compound has been treated with sulfuric acid, such as those obtained by dissolving into sulfuric acid, mixing the sulfuric acid solution with a water-soluble organic solvent which is inactive in sulfuric acid and adding water to the mixture solution, those obtained by mixing the sulfuric acid solution with an aqueous solution of a water-soluble organic solvent which is inactive in sulfuric acid, those obtained by adding water to the sulfuric acid solution, and the like. By the above treatment of dissolving into sulfuric acid, the particle size of the squarylium compound is made very fine compared with prior to the treatment, and dispersiblity is improved. By using the squarylium compound provided with the above treatment, it is possible to obtain an electrophotographic photoreceptor having a higher spectral sensitivity and more excellent charging properties.

As the water-soluble organic solvent which is inactive in sulfuric acid, there are water-soluble lower alcohols, glycols, glycol ethers, carboxylic acids, and the like.

The photoconductive material used in the electrographic photoreceptor of the invention may be a mixture of copper phthalocyanine, the photoconductive squarylium compound, copper tetranitrophthalocyanine (A) and/or copper tetranitrophthalocyanine (B) provided with the above treatment to convert the crystalline form of copper phthalocyanine to α-form.

Some embodiments of the photoreceptor of the invention are illustrated in FIGS. 2 through 5.

Figure 2:
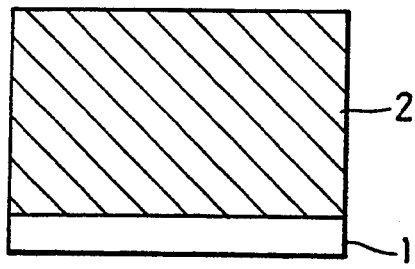
FIGS. 2 through 5 are sectional views of electrophotographic photoreceptors embodying the invention, respectively.

The electrophotographic photoreceptor of FIG. 2 is composed of a photosensitive layer 2 containing the α-form copper phthalocyanine composition and the photoconductive squarylium compound on a conductive substrate 1.

Figure 3:
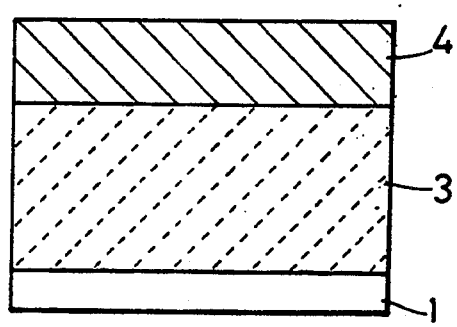

The electrophotographic photoreceptor of FIG. 3 is composed of a first photosensitive layer 3 containing a pigment on a conductive substrate 1 and a second photosensitive layer containing the α-form copper phthalocyanine composition and the photoconductive squarylium compound formed further thereon.

Figure 4:
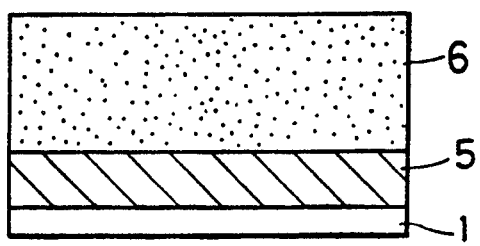

The electrophotographic photoreceptor of FIG. 4 is composed of a charge generation layer 5 containing the α-form copper phthalocyanine composition and the photoconductive squarylium compound on a conductive substrate 1 and a charge transport layer 6 formed further thereon. A small amount of charge transport material may be added to the charge generation layer 5.

Figure 5:
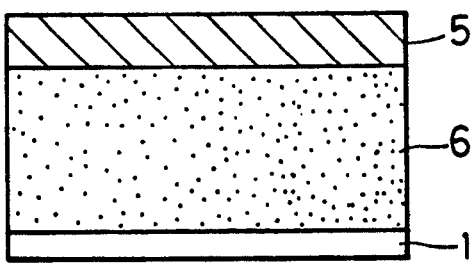

The electrophotographic photoreceptor of FIG. 5 is composed of a charge transport layer 6 on a conductive substrate 1 and a charge generation layer 5 further formed thereon.

The α-form copper phthalocyanine composition and the squarylium compound can be used not only as photoconductive materials of single layer-type photoreceptor but also as charge generation materials of functionally separating type photoreceptor. Moreover, in the case of using copper phthalocyanine pigment or the like as a charge generation material, it is, in general, combined with a charge transport material in hole transport type. When it is combined with a charge treanspost material in electron transport type, photosensitivity is miner. However, photoconductive material of the invention exhibits good properties by combining with either of the hole transport material or the electron transport one.

In the electrophotographic photoreceptor of the invention, the photosensitive layers 2, can be prepared by dispersing the α-form copper phthalocyanine composition and the squarylium compound in a binder resin and applying it onto the conductive substrate 1. The second photosensitive layer 4 and the charge generation layer 5 may be formed by applying dispersion or deposition of the α-form copper phthalocyanine composition and the squarylium compound onto the conductive substrate 1, the first photosensitive layer 3 or the charge transport layer 6. As the binder resin, there are thermoplastic resins, such as polyester resins, polycarbonate resins and polyvinyl butyral resins, and thermosetting resins having a high volume specific resistance, such as polyurethane resins, epoxy resins, melamine resins, formalin resins and phenol resins. In the dispersion type, a suitable content of the sum of the α-form copper phthalocyanine composition and the squarylium compound in the photosensitive layer 2, second photosensitive layer 4, or charge generation layer 6 is 10 to 60 wt. %, preferably 20 to 30 wt. %.

The pigment contained in the first photosensitive layer 3 in the electrophotographic photoreceptor of the invention may be anyone which can be injected with a carrier produced in the second photosensitive layer 4 by the irradiation of light and transports efficiently. As such a pigment, there are phthalocyanine pigments, perylene pigments, anthraquinone pigments, squarylium pigments, azo pigments, quinacridone pigments, and the like. A low molecular charge transport material or the α-form copper phthalocyanine composition used in the second photosensitive layer may be incorporated into the first photosensitive layer containing a pigment. As the blendable low molecular charge transport material, there are hydrazone compounds, styryl compounds, triphenylamine compounds, and the like.

The photosensitive layer 3 containing a pigment may be prepared by dispersing the pigment into the binder resin, and applying it onto the conductive substrate. As the binder resin, there are thermoplastic resins, such as polyester resins, polycarbonate resins and polyvinyl butyral resins, and thermosetting resins having a high volume specific resistance, such as polyurethane resins, epoxy resins, melamine resins, formalin resins and phenol resins. A suitable content of the pigment in the first photoconductive layer 3 is 10 to 60 wt. %, preferably 20 to 40 wt. %.

The charge transport material and the binder resin used for the charge transport layer 6 may be those used in conventional electrophotographic photoreceptors. Such a charge transport material includes polyvinyl carbazole, hydrazone compounds, styryl compounds, triphenylamine compounds, quinone compounds, thioxanthone compounds, and the like. The binder resin may be any resin having excellent adhesiveness and insulating properties.

The charge transport layer 6 may be prepared by dispersing the charge transport material into the binder resin, and applying it onto the conductive substrate 1 or the charge generation layer 5.

Either of the photosensitive layers 2,3,4, the charge generation layer 5 and/or the charge transport layer 6 may be blended with a plasticizer for improving plasticity, adhesiveness and mechanical strength, an antioxidant for improving the chemical strength to the extent so as not to degrade the photosensitive properties of the photoreceptor. The photoreceptor is provided optionally with an intermediate layer in order to improve its adhesiveness to the conductive substrate 1 or to inhibit the injection of carriers from the conductive substrate 1, a surface-protective layer in order to improve mechanical properties, or the like.

As the coating means of the photosensitive layers 2,3,4, the charge generation layer 5, the charge transport layer 6, or the intermediate layer, etc., a doctor blade, wire bar, roll coater or the like are, in general, usable.

In the case of the electrophotographic photoreceptor of FIG. 2, the thickness of the photosensitive layer 2 is usually 5 to 50 μm, preferably 10 to 20 μm. When an intermediate layer or a surface-protective layer is provided, its thickness is preferably less than 1 μm.

In the case of the electrophotographic photoreceptor of FIG. 3, the thickness of the first photosensitive layer 3 is 5 to 50 μm, preferably 10 to 20 μm, and the thickness of the second photosensitive layer 4 is 0.2 to 5 μm, preferably 0.5 to 2 μm. When an intermediate layer or a surface-protective layer is provided, its thickness is preferably less than 1 μm.

In the case of the electrophotographic photoreceptors of FIGS. 4 and 5, the thickness of the charge generation layer 5 is less than 5 μm, preferably 0.1 to 1 μm, and the thickness of the charge transport layer 6 is 5 to 50 μm, preferably 10 to 20 μm. When an intermediate layer or a surface-protective layer is provided, its thickness is preferably less than 1 μm.

The conductive substrate 1 may be those used in conventional ones, such as metal substrates, e.g. aluminum, stainless steel, copper or brass, insulating substrates onto which aluminum, indium oxide or the like is deposited, and so on.

The electrophotographic photoreceptor of the invention, which uses a mixture of the α-form copper phthalocyanine composition and the photoconductive squarylium compound as the photoconductive material, exercises a high spectral sensitivity in a wide wavelength range from the visible region to the infrared region. Particularly, the electrophotographic photoreceptor of the invention, which uses a photoconductive squarylium compound treated with sulfuric acid, exercises a higher spectral sensitivity in a wide wavelength range from the visible region to the infrared region. Moreover, the photoconductive material used in the invention has excellent repeatability due to its chemical stability. A electrophotographic photoreceptor having a higher sensitivity and better durability and resistance to printing can be provided by selecting a binder resin or the like. Furthermore, since the electrophotographic photoreceptor of the invention exhibits high photosensitivity in a wide wavelength range from the visible region to the infrared region, it is applicable to laser printers, liquid crystal shutter printers, LED printers, and the like, as well as full color electrophotography.

In the case of using in a positively charged type, the generation of ozone is hardly caused in the charging process. Electrophotographic photoreceptors as shown in FIG. 2 or FIG. 3 exhibit induction phenomenon specific to the pigment-dispersed type photoreceptor in a region of very low light quantity as well as a high sensitivity, they can be used as an electrophotographic photoreceptor having a high resolution which is not affected by the light distribution at edge portions of a spot of irradiated light, nor light leaked through a liquid crystal shutter.

Furthermore, in the case of the electrophotographic photoreceptor wherein the photosensitive layer containing the α-form copper phthalocyanine composition and the photoconductive squarylium compound as the photoconductive material is laminated onto the photosensitive layer containing the pigment, the photosensitivity can be impoved sharply.

EXAMPLES

Example 1

9.2 g of copper phthalocyanine and 0.8 g (8 wt. %) of copper tetranitrophthalocyanine (A) were dissolved into 100 g of sulfuric acid, and the solution was poured into 2 l of ice water to obtain an α-form copper phthalocyanine composition. A squarylium compound having the following formula was synthesized by heating squarylic acid and N,N-dimethylaniline in a mixture solvent of n-butanol and toluene, and dehydrated through azeotropic reaction. 4.5 g of the α-form copper phthalocyanine composition and 0.5 g the photoconductive squarylium compound synthesized and purified as above were mixed with a polymer solution prepared by dissolving 20 g of polyester resin into 180 g of cyclohexanone, and dispersed by a shaking type dispersing machine for 3 hours. The solution obtained was applied onto an aluminum deposited polyester film by a wire bar to form a photosensitive layer 17 μm in dry thickness.

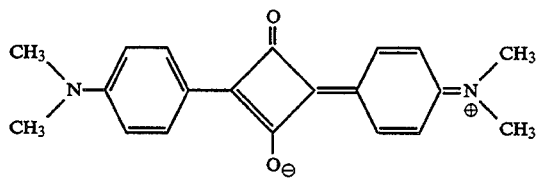

Figure 6:
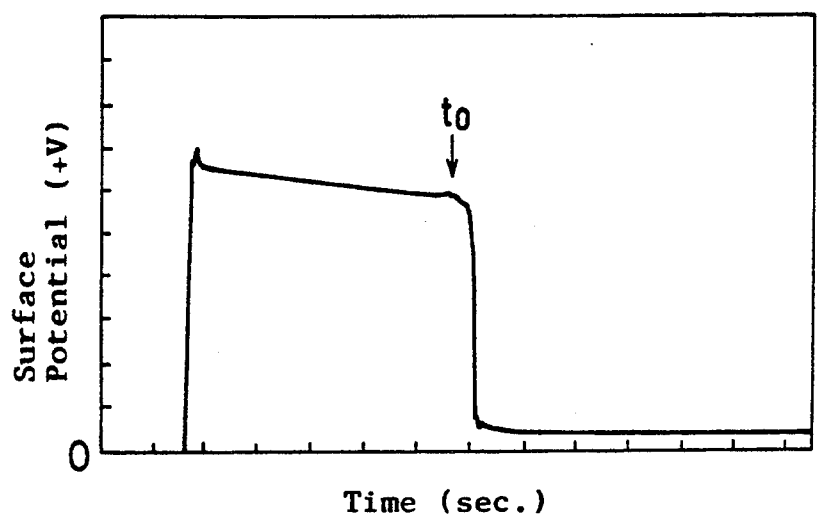
FIG. 6 shows light decay curve of an electrophotographic photoreceptor of the invention.
Figure 7:
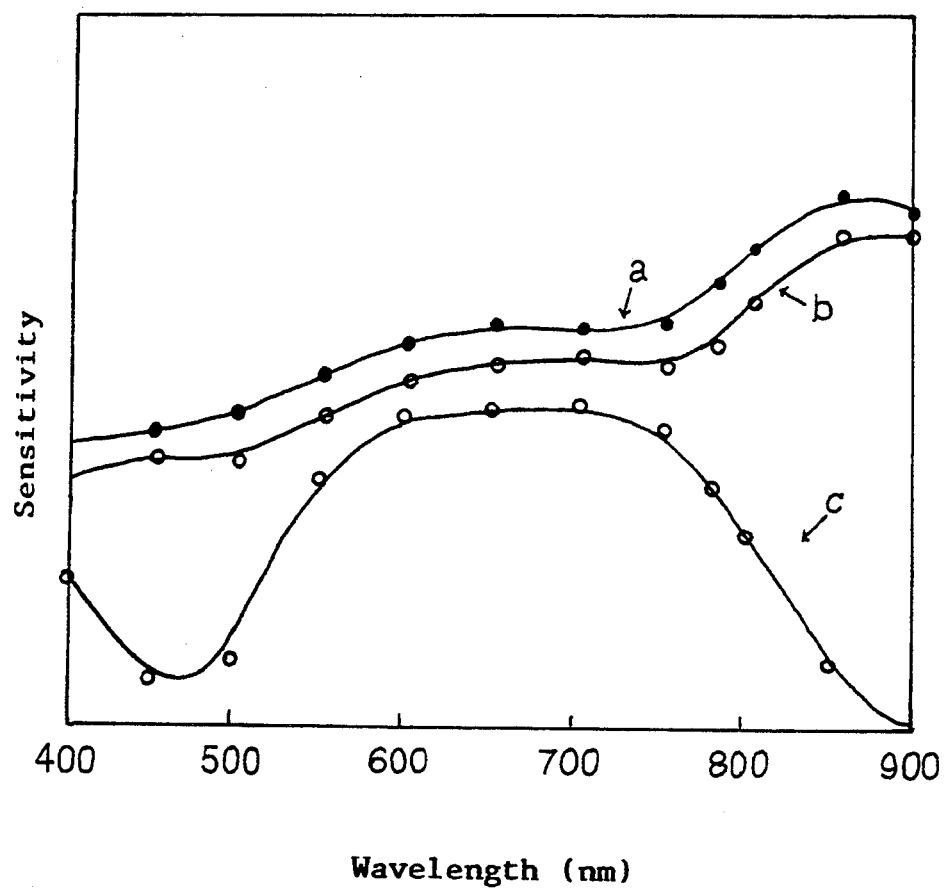
FIG. 7 shows spectral sensitivities of an example of the photographic photoreceptor of the invention and comparative examples.

The electrophotographic photoreceptor thus prepared was charged by corona discharge at +6 kV at a dark place and then exposed to monochromatic light at 780 nm at an intensity of illumination of 2.5 μW/cm² for 20 seconds, in order to examine the photoreceptor properties. Measured photoreceptor properties were initially charged potential $V_o$ after charging, time $t_D$ necessary for dark-decaying from 620 V to 600 V in surface potential, quantity of exposed light $E_{\frac{1}{2}}$ necessary for light-decaying from 600 V to 300 V and residual potential $V_r$ after light irradiation for 20 seconds. Furthermore, similar operations were repeated 1000 times as to the electrophotographic photoreceptor, and $V_o$ (1000), $t_D$ (1000), $E_{\frac{1}{2}}$ (1000) and $V_r$(1000) were measured to evaluate durability. The results are shown in Table 1. A light decay curve obtained by irradiating light at time $t_o$ after charging was shown in FIG. 6. As can be seen from FIG. 6, the electrophotographic photoreceptor of the invention has a high sensitivity, and exhibits induction phenomenon specific to the pigment dispersion-type photoreceptor in a region of very low light quantities. A spectral sensitivity was evaluated by using monochromatic light having an intensity of illumination of 2.5 μW/cm² from the visible region to the infrared region. The results are shown in FIG. 7 as curve b. As can be seen from curve b, the electrophotographic photoreceptor of the invention has a high sensitivity from the visible region to the infrared region.

Example 2

An electrophotographic photoreceptor was prepared under conditions similar to Example 1, except that the α-form copper phthalocyanine composition used was composed of 2 wt. % of copper tetranitrophthalocyanine (B) and copper phthalocyanine. The photoreceoptor properties were shown in Table 1. The light decay curve was similar to FIG. 6. The spectral sensitivity properties were similar to curve b in FIG. 7.

Example 3

An electrophotographic photoreceptor was prepared under conditions similar to Example 1, except that the α-form copper phthalocyanine composition was composed of 4 wt. % of copper tetranitrophthalocyanine (A), 1 wt. % of copper tetranitrophthalocyanine (B) and copper phthalocyanine and the binder resin was thermosetting-type melamine resin. The photoreceptor properties were shown in Table 1. The light decay curve was similar to FIG. 6. The spectral sensitivity properties were similar to the curve b in FIG. 7.

Example 4

A squarylium compound was synthesized by heating squarylic acid and N,N-dimethylaniline in a solvent mixture of n-butanol and toluene, and dehydrated through an azeotropic reaction. 1 g of the squarylium compound was added to 10 g of sulfuric acid, and the sulfuric acid solution was added dropwise into 400 g of diethylene glycol dimethyl ether in an ice bath. Thereafter, 100 g of water was gradually added to obtain a squarylium compound treated with sulfuric acid.

9.2 g of copper phthalocyanine and 0.8 g (8 wt. %) of copper tetranitrophthalocyanine (A) were dissolved into 100 g of sulfuric acid, and the solution was poured into 2 l of ice water to obtain an α-form copper phthalocyanine composition. 4.5 g of the α-form copper phthalocyanine composition and 0.5 g of the above squarylium compound treated with sulfuric acid were mixed with a polymer solution prepared by dissolving 20 g of a polyester resin into 180 g of cyclohexanone, and dispersed by a shaking type dispersing machine for 3 hours. The solution obtained was applied onto an aluminum coated polyester film by a wire bar to form a photosensitive layer 17 μm in dry thickness.

Photoreceptor properties of the electrophotographic photoreceptor thus prepared were shown in Table 1. The light decay curve of the photoreceptor obtained was as shown in FIG. 6, similar to Example 1. The spectral sensitivity was evaluated by using monochromatic light having an intensity of illumination of 2.5 µW/cm² from visible region to infrared region. The results are shown in FIG. 7 as the curve a. As can be seen from the curve a, the electrophotographic photoreceptor has a high sensitivity from the visible region to the infrared region, and its sensitivity is higher than the electrophotographic photoreceptor of Example 1.

Example 5

An electrophotographic photoreceptor was prepared under the conditions similar to Example 4, except that the α-form copper phthalocyanine composition used was composed of 2 wt. % of copper tetranitrophthalocyanine (B) and copper phthalocyanine. The photoreceptor properties as shown in Table 1. The light decay curve was similar to FIG. 6. The spectral sensitivity properties were similar to curve a in FIG. 7.

Example 6

An electrophotographic photoreceptor was prepared under conditions similar to Example 4, except that the α-form copper phthalocyanine composition was composed of 4 wt. % of copper tetranitrophthalocyanine (A), 1 wt. % of copper tetranitrophthalocyanine (B) and copper phthalocyanine and the binder resin was a thermosetting-type mealmine resin. The photoreceptor properties are shown in Table 1. The light decay curve was similar to FIG. 6. The spectral sensitivity properties were similar to curve a in FIG. 7.

mixture of n-butanol and toluene, and dehydrated through azeotropic reaction. 1 g of the squarylium compound was added to 10 g of sulfuric acid, and the sulfuric acid solution was added dropwise into 500 g of water to prepare a squarylium compound treated with sulfuric acid.

Except for using the above squarylium compound treated with sulfuric acid, an electrophotographic photoreceptor was prepared under conditions similar to Example 4. The photoreceptor properties were similar to Example 4. The light decay curve was similar to FIG. 6. The spectral sensitivity properties were similar to the curve a in FIG. 7.

Comparative Example 1

An electrophotographic photoreceptor was prepared under conditions similar to Example 1, except that only the α-form copper phthalocyanine composition composed of 2 wt. % of copper tetranitrophthalocyanine (B) and copper phthalocyanine was used as the photoconductive material and the binder resin was a thermosetting-type mealmine resin. The spectral sensitivity properties were shown in FIG. 7 as the curve c. It can be seen that the sensitivity lowers in wavelength regions of less than 550 nm and more than 750 nm. The photoreceptor properties were as follows:

$V_o = 789$ V $t_D = 16$ sec.

$E_{\frac{1}{2}} = 1.9$ µJ/cm²

$V_r = 47$ V

TABLE 1

| Photoreceptor Properties | Example 1 | Example 2 | Example 3 | Example 4 | Example 5 | Example 6 |
|---|---|---|---|---|---|---|
| $V_o$ [V] | 780 | 792 | 856 | 796 | 798 | 856 |
| $t_D$ [sec.] | 15 | 14 | 17 | 17 | 16 | 19 |
| $E_{\frac{1}{2}}$ [µJ/cm²] | 1.1 | 0.9 | 1.2 | 0.8 | 0.7 | 0.7 |
| $V_r$ [V] | 36 | 36 | 46 | 35 | 41 | 48 |
| $V_o$ (1000) [V] | 765 | 783 | 848 | 786 | 792 | 842 |
| $t_D$ (1000) [sec.] | 13 | 12 | 17 | 15 | 15 | 16 |
| $E_{\frac{1}{2}}$ (1000) [µJ/cm²] | 1.0 | 0.9 | 1.1 | 0.8 | 0.7 | 0.7 |
| $V_r$ (1000) [V] | 42 | 42 | 52 | 38 | 43 | 51 |

Example 7

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into an aqueous diethylene glycol dimethyl ether solution prepared by mixing 400 g of diethylene glycol dimethyl ether and 100 g of water to prepare a squarylium compound treated with sulfuric acid.

Except for using the above squarylium compound treated with sulfuric acid, an electrophotographic photoreceptor was prepared under conditions similar to Example 4. The photoreceptor properties were similar to Example 4. The light decay curve was similar to FIG. 6. The spectral sensitivity properties were similar to curve a in FIG. 7.

Example 8

A squarylium compound was synthesized by heating suqarylic acid and N,N-dimethylaniline in a solvent $V_o$ (1000) = 780 V $t_D$ (1000) = 15 sec.

$E_{\frac{1}{2}}$ (1000) = 1.9 µJ/cm²

$V_r$ (1000) = 58 V

Comparative Example 2

An electrophotographic photoreceptor was prepared by a method similar to Example 1, except that 4.96 g of the α-form copper phthalocyanine composition composed of 2 wt. % of copper tetranitrophthalocyanine (B) and copper phthalocyanine and 0.04 g (0.8 wt. % of the α-form copper phthalocyanine composition) of the photoconductive squarylium compound were used as the photoconductive material, and the spectral sensitivity properties were evaluated. As a result, panchromatic spectral properties could not obtained similar to Comparative Example 1.

Comparative Example 3

An electrophotographic photoreceptor was prepared by a method similar to Example 1, except that 3.25 g of the α-form copper phthalocyanine composition composed of 2 wt. % of copper tetranitrophthalocyanine (B) and copper phthalocyanine and 1.75 g (35 wt. % of the α-form copper phthalocyanine composition) of the photoconductive squarylium compound were used as the photoconductive material. The photoreceptor properties were as follows, which indicate that the photoreceptor has a low charge acceptance and is unsuitable for practical use.

$V_o=201$ V $V_r=112$ V

Comparative Example 4

An electrophotographic photoreceptor was prepared by a method similar to Example 4, except that 4.96 g of the α-form copper phthalocyanine composition composed of 2 wt. % of copper tetranitrophthalocyanine (B) and copper phthalocyanine and 0.04 g (0.8 wt. % of the α-form copper phthalocyanine composition) of the squarylium compound prepared in Example 4 were used as the photoconductive material, and the spectral sensitivity properties were evaluated. As a result, panchromatic spectral properties could not obtained similar to Comparative Example 2.

Comparative Example 5

An electrophotographic photoreceptor was prepared by a method similar to Example 4, except that 3.25 g of the α-form copper phthalocyanine composition composed of 2 wt. % of copper tetranitrophthalocyanine (B) and copper phthalocyanine and 1.75 g (35 wt. % of the α-form copper phthalocyanine composition) of the squarylium compound prepared in Example 1 were used as the photoconductive material. The photoreceptor properties were as follows, which indicate that the photoreceptor has a low charge acceptance and is unsuitable for practical use.

$V_o=226$ V $V_r=141$ V

Example 9

Using 10 g of copper phthalocyanine, α-form copper phthalocyanine was prepared by the acid pasting method. 5 g of the α-form copper phthalocyanine was mixed with a polymer solution prepared by dissolving 20 g of polyester resin into 180 g of cyclohexanone, and dispersed by a shaking type dispersing machine for 3 hours. The solution obtained was applied onto an aluminum coated polyester film by a wire bar to form a first photosensitive layer 16 μm in dry thickness.

9.2 g of copper phthalocyanine and 0.8 g (8 wt. %) of copper tetranitrophthalocyanine (A) were dissolved into 100 g of sulfuric acid, and the solution was poured into 2 l of ice water to obtain an α-form copper phthalocyanine composition. A dispersion composed of 4.5 g of the α-form copper phthalocyanine composition, 0.5 g of the squarylium compound used in Example 1, 4 g of polyester resin and 36 g of cyclohexanone was prepared similarly, and applied onto the first photosensitive layer so that the total dry thickness of the first and second photosensitive layers was 17 μm to obtain an electrophotographic photoreceptor.

As to the electrophotographic photoreceptor thus prepared, photoreceptor properties, light decay curve and spectral sensitivity properties were measured similar to Example 1, and the results were shown in Table 2. The light decay curve was similar to FIG. 6. As can be seen from the results, the electrophotographic photoreceptor of the invention has a high sensitivity, and exhibits an induction phenomenon specific to the pigment dispersion-type photoreceptor in a region of very low light quantities. The spectral sensitivity properties were similar to curve b in FIG. 7, and it can be seen that the photoreceptor has a high sensitivity from the visible region to the infrared region.

Example 10

An electrophotographic photoreceptor was prepared under conditions similar to Example 9, except that the α-form copper phthalocyanine composition used was composed of 2 wt. % of copper tetranitrophthalocyanine (B) and copper phthalocyanine. The photoreceptor properties are shown in Table 2. The light decay curve was similar to FIG. 6. The spectral sensitivity properties were similar to the curve b in FIG. 7.

Example 11

An electrophotographic photoreceptor was prepared under conditions similar to Example 9, except that the α-form copper phthalocyanine composition was composed of 2 wt. % of copper tetranitrophthalocyanine (B) and copper phthalocyanine and the binder resin of the first and second photosensitive layers was a thermosetting-type melamine resin. The photoreceptor properties are shown in Table 2. The light decay curve was similar to FIG. 6. The spectral sensitivity properties were similar to the curve b in FIG. 7.

Example 12

An electrophotographic photoreceptor was prepared under conditions similar to Example 9, except that the α-form copper phthalocyanine composition was composed of 2 wt. % of copper tetranitrophthalocyanine (B) and copper phthalocyanine and the following perylene pigment was used as the pigment incorporated into the first photosensitive layer. The photoreceptor properties are shown in Table 2. The light decay curve was similar to FIG. 6. The spectral sensitivity properties were similar to the curve b in FIG. 7.

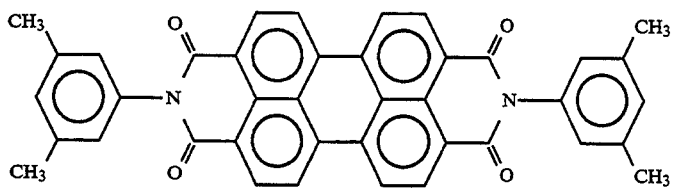

Example 13

An electrophotographic photoreceptor was prepared under conditions similar to Example 9, except that the α-form copper phthalocyanine composition was composed of 2 wt. % of copper tetranitrophthalocyanine (B) and copper phthalocyanine and the pigment incorporated into the first photosensitivity layer was replaced by the following pigment. The photoreceptor properties are shown in Table 2. The light decay curve was similar to FIG. 6. The spectral sensitivity properties were similar to the curve b in FIG. 7.

to FIG. 6. The spectral sensitivity properties were similar to the curve b in FIG. 7.

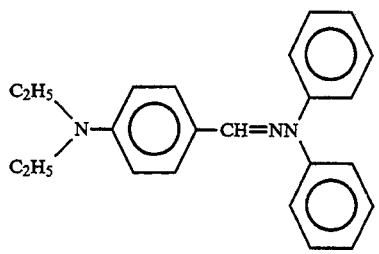

TABLE 2

| Photoreceptor Properties | Example 9 | Example 10 | Example 11 | Example 12 | Example 13 | Example 14 | Example 15 |
| --- | --- | --- | --- | --- | --- | --- | --- |
| $V_o$ [V] | 782 | 800 | 841 | 741 | 760 | 763 | 756 |
| $t_D$ [sec.] | 17 | 19 | 20 | 16 | 17 | 17 | 15 |
| $E_{\frac{1}{2}}$ [μJ/cm$^2$] | 1.4 | 1.3 | 1.3 | 2.1 | 3.0 | 1.2 | 1.9 |
| $V_r$ [V] | 46 | 41 | 56 | 59 | 68 | 52 | 55 |
| $V_o$ (1000) [V] | 760 | 789 | 838 | 728 | 726 | 758 | 751 |
| $t_D$ (1000) [sec.] | 16 | 17 | 18 | 14 | 16 | 16 | 13 |
| $E_{\frac{1}{2}}$ (1000) [μJ/cm$^2$] | 1.3 | 1.3 | 1.3 | 2.0 | 3.3 | 1.0 | 1.7 |
| $V_r$ (1000) [V] | 58 | 49 | 61 | 63 | 72 | 58 | 61 |

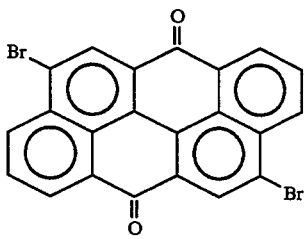

Example 14

An electrophotographic photoreceptor was prepared under conditions similar to Example 9, except that the α-form copper phthalocyanine composition was composed of 4 wt. % of copper tetranitrophthalocyanine (A), 1 wt. % of copper tetranitrophthalocyanine (B) and copper phthalocyanine. The photoreceptor properties are shown in Table 2. The light decay curve was similar to FIG. 6. The spectral sensitivity properties were similar to the curve b in FIG. 7.

Example 15

An electrophotographic photoreceptor was prepared under conditions similar to Example 9, except that the perylene pigment used in Example 12 was used as the pigment incorporated into the first photosensitive layer, the following hydrazone compound was added in an amount of 5 wt. % of the perylene pigment as the low molecular charge transport material, and the α-form copper phthalocyanine composition composed of 2 wt. % of copper tetranitrophthalocyanine (B) and copper phthalocyanine was used. The photoreceptor properties are shown in Table 2. The light decay curve was similar

Example 16

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 400 g of diethylene glycol dimethyl ether on an ice bath. Thereafter, 100 g of water was gradually added to obtain a squarylium compound treated with sulfuric acid.

An electrophotographic photoreceptor was prepared under conditions similar to Example 9, except for using the above squarylium compound. Its photoreceptor properties are shown in Table 3. The light decay curve was as shown in FIG. 6 similar to Example 1. As can be seen from the results, the electrophotographic photoreceptor of the invention has a high sensitivity, and exhibits an induction phenomenon specific to the pigment dispersion-type photoreceptor in a region of very weak light quantities. The spectral sensitivity properties were similar to curve a in FIG. 7, and it can be seen that the photoreceptor has a high sensitivity from the visible region to the infrared region, and its sensitivity is higher than Example 9.

Example 17

An electrophotographic photoreceptor was prepared under conditions similar to Example 9, except that the α-form copper phthalocyanine composition composed of 2 wt. % of copper tetranitrophthalocyanine (B) and copper phthalocyanine and the squarylium compound prepared in Example 16 were used. The photoreceptor properties are shown in Table 3. The light decay curve was similar to FIG. 6. The spectral sensitivity properties were similar to curve a in FIG. 7.

Example 18

An electrophotographic photoreceptor was prepared under conditions similar to Example 9, except that thermosetting-type melamine resin was used as the binder resin of the first and second photosensitive layers and the squarylium compound prepared in Example 16 was used as the squarylium compound of the second photosensitive layer. The photoreceptor properties are shown in Table 3. The light decay curve was similar to FIG. 6. The spectral sensitivity properties were similar to curve a in FIG. 7.

Example 19

An electrophotographic photoreceptor was prepared under conditions similar to Example 9, except that the perylene pigment used in Example 12 was used as the pigment incorporated into the first photosensitive layer, and the squarylium compound prepared in Example 16 was used as the squarylium compound of the second photosensitive layer. The photoreceptor properties are shown in Table 3. The light decay curve was similar to FIG. 6. The spectral sensitivity properties were similar to the curve a in FIG. 7.

Example 20

An electrophotographic photoreceptor was prepared under conditions similar to Example 9, except that the pigment used in Example 13 was used as the pigment incorporated into the first photosensitive layer, and the squarylium compound prepared in Example 16 was used as the squarylium compound of the second photosensitive layer. The photoreceptor properties are shown in Table 3. The light decay curve was similar to FIG. 6. The spectral sensitivity properties were similar to curve a in FIG. 7.

Example 21

An electrophotographic photoreceptor was prepared under conditions similar to Example 9, except that the α-form copper phthalocyanine composition was composed of 4 wt. % of copper tetranitrophthalocyanine (A), 1 wt. % of copper tetranitrophthalocyanine (B) and copper phthalocyanine and the squarylium compound prepared in Example 16 was used as the squarylium compound. The photoreceptor properties are shown in Table 3. The light decay curve was similar to FIG. 6. The spectral sensitivity properties were similar to curve a in FIG. 7.

Example 22

An electrophotographic photoreceptor was prepared under conditions similar to Example 9, except that the perylene pigment used in Example 12 was used as the pigment incorporated into the first photosensitive layer the hydrazone compound used in Example 15 was added in an amount of 5 wt. % of the perylene pigment as the low molecular charge transport material, and the squarylium compound prepared in Example 16 was used as the squarylium compound of the second photosensitive layer. The light decay curve was similar to FIG. 6. The photoreceptor properties are shown in Table 3. The spectral sensitivity properties were similar to curve a in FIG. 7.

Example 23

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into an aqueous diethylene glycol dimethyl ether solution prepared by mixing 400 g of diethylene glycol dimethyl ether and 100 g of water to prepare a squarylium compound treated with sulfuric acid.

Except using the above squarylium compound treated with sulfuric acid, an electrophotographic photoreceptor was prepared under conditions similar to Example 9. The photoreceptor properties, the light decay curve and the spectral sensitivity properties were similar to Example 16.

Example 24

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 500 g of water to prepare a squarylium compound treated with sulfuric acid.

Except using the above squarylium compound treated with sulfuric acid, an electrophotographic photoreceptor was prepared under conditions similar to Example 9. The photoreceptor properties, the light decay curve and the spectral sensitivity properties were similar to Example 16.

TABLE 3

| Photoreceptor Properties | Example 16 | Example 17 | Example 18 | Example 19 | Example 20 | Example 21 | Example 22 |
|---|---|---|---|---|---|---|---|
| $V_o$ [V] | 771 | 780 | 826 | 753 | 757 | 774 | 745 |
| $t_D$ [sec.] | 16 | 18 | 18 | 17 | 18 | 16 | 16 |
| $E_{\frac{1}{2}}$ [μJ/cm$^2$] | 1.2 | 1.1 | 1.2 | 1.8 | 2.5 | 0.9 | 1.3 |
| $V_r$ [V] | 51 | 56 | 59 | 61 | 61 | 56 | 51 |
| $V_o$ (1000) [V] | 768 | 786 | 821 | 745 | 752 | 769 | 741 |
| $t_D$ (1000) [sec.] | 16 | 17 | 18 | 16 | 17 | 16 | 15 |
| $E_{\frac{1}{2}}$ (1000) [μJ/cm$^2$] | 1.1 | 1.0 | 1.1 | 1.8 | 2.8 | 0.8 | 1.1 |
| $V_r$ (1000) [V] | 58 | 52 | 61 | 64 | 65 | 59 | 58 |

Example 25

10 g of the hydrazone compound used in Example 15 as the charge transport material was dissolved in a polymer solution prepared by dissolving 10 g of polycarbonate resin into 90 g of cyclohexanone. The solution obtained was applied onto an aluminum coated polyester film by a wire bar to form a charge transport layer 17 μm in thickness.

9.2 g of copper phthalocyanine and 0.8 g (8 wt. %) of copper tetranitrophthalocyanine (A) were dissolved into 100 g of sulfuric acid, and the solution was poured into 2 l of ice water to obtain an α-form copper phthalocyanine composition. 4.5 g of the α-form copper phthalocyanine composition, 0.5 g of the squarylium compound used in Example 1, 32 g of fluorine-contained polymer having a solid content of 50 wt. % and 10 g of melamine resin having a nonvolatile component content of 80 wt. % were mixed with 140 g of cyclohexanone, and dispersed by a shaking type dispersing machine for 3 hours. The solution obtained was applied onto the charge transport layer by a wire bar to prepare an electrophotographic photoreceptor having a total layer thickness of the charge transport layer and the charge generation layer of 18 μm after curing.

The photoreceptor properties were measured similar to Example 1 except for using monochromatic light at 550 nm. The spectral sensitivity properties of the electrophotographic photoreceptor thus prepared were measured similar to Example 1. The results are shown in Table 4. The spectral sensitivity properties were similar to curve b in FIG. 7, and accordingly, it can be seen that the electrophotographic photoreceptor of the invention has a high sensitivity from visible region to infrared region. Moreover, a wrapping test was conducted of the photoreceptor around the drum of a real apparatus. As a result, no damage occurred on the surface of the photoreceptor and printing quality did not vary, after printing 1,000 sheets.

Example 26

An electrophotographic photoreceptor was prepared under conditions similar to Example 25, except that the α-form copper phthalocyanine composition was composed of 2 wt. % of copper tetranitrophthalocyanine (B) and copper phthalocyanine and the binder resin of the charge generation layer was epoxy resin. The photoreceptor properties are shown in Table 4. The spectral sensitivity properties and the real apparatus test were similar to Example 25.

Example 27

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 400 g of diethylene glycol dimethyl ether in an ice bath. Thereafter, 100 g of water was gradually added to obtain a squarylium compound treated with sulfuric acid.

An electrophotographic photoreceptor was prepared under the conditions similar to Example 25, except for using the above squarylium compound. The photoreceptor properties and the spectral sensitivity properties were evaluated similar to Example 1. The photoreceptor properties are shown in Table 4. The spectral sensitivity properties were similar to curve a in FIG. 7. It can be seen from curve a that the electrophotographic photoreceptor of the invention has a high sensitivity from the visible region to the infrared region, and the its sensitivity is higher than Example 25. Moreover, a wrapping test was conducted of the photoreceptor around the drum of a real apparatus. As a result, no damage occurred on the surface of the photoreceptor and printing quality did not vary, after printing 1,000 sheets.

Example 28

An electrophotographic photoreceptor was prepared under conditions similar to Example 25, except that the squarylium compound was prepared in Example 27, the α-form copper phthalocyanine composition was composed of 2 wt. % of copper tetranitrophthalocyanine (B) and copper phthalocyanine and the binder resin of the charge generation layer was an epoxy resin. The photoreceptor properties and shown in Table 4. The spectral sensitivity properties and the real apparatus test were similar to Example 27.

TABLE 4

| Photoreceptor Properties | Example 25 | Example 26 | Example 27 | Example 28 |
|---|---|---|---|---|
| $V_o$ [V] | 761 | 748 | 776 | 753 |
| $t_D$ [sec.] | 17 | 14 | 16 | 15 |
| $E_{\frac{1}{2}}$ [μJ/cm$^2$] | 1.8 | 1.6 | 1.2 | 1.1 |
| $V_r$ [V] | 50 | 48 | 53 | 56 |
| $V_o$ (1000) [V] | 738 | 732 | 762 | 750 |
| $t_D$ (1000) [sec.] | 15 | 12 | 15 | 13 |
| $E_{\frac{1}{2}}$ (1000) [μJ/cm$^2$] | 1.6 | 1.6 | 1.1 | 1.0 |
| $V_r$ (1000) [V] | 61 | 53 | 59 | 52 |

Example 29

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into an aqueous diethylene glycol dimethyl ether solution prepared by mixing 400 g of diethylene glycol dimethyl ether and 100 g of water to prepare a squarylium compound treated with sulfuric acid.

Except using the above squarylium compound treated with sulfuric acid, an electrophotographic photoreceptor was prepared under conditions similar to Example 25. The photoreceptor properties, the spectral sensitivity properties and the real apparatus test were similar to Example 27.

Example 30

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 500 g of water to prepare a squarylium compound treated with sulfuric acid.

Except using the above squarylium compound treated with sulfuric acid, an electrophotographic photoreceptor was prepared under conditions similar to Example 25. The photoreceptor properties, the spectral sensitivity properties and the real apparatus test were similar to Example 27.

Comparative Example 6

An electrophotographic photoreceptor was prepared under conditions similar to Example 25, except that only an α-form copper phthalocyanine composition composed of 2 wt. % of copper tetranitrophthalocyanine (B) and copper phthalocyanine was used as the photoconductive material. The spectral sensitivity properties were similar to curve c in FIG. 7. It can be seen that the sensitivity lowers in wavelength regions of less than 550 nm and more than 750 nm. The photoreceptor properties were as follows:

$V_o = 788$ V $t_D = 16$ sec.

$E_{\frac{1}{2}} = 6.6$ μJ/cm$^2$ $V_r = 47$ V $V_o(1000) = 762$ V $t_D(1000) = 13$ sec.

$E_{\frac{1}{2}}(1000) = 6.0$ μJ/cm$^2$ $V_r(1000) = 55$ V

Example 31

9.2 g of copper phthalocyanine and 0.8 g (8 wt. %) of copper tetranitrophthalocyanine (A) were dissolved into 100 g of sulfuric acid, and the solution was poured into 2 l of ice water to obtain an α-form copper phthalocyanine composition. 4.5 g of the α-form copper phthalocyanine composition and 0.5 g of the photoconductive squarylium compound used in Example 1 were mixed with a polymer solution prepared by dissolving 20 g of polyester resin into 180 g of cyclohexanone, and dispersed by a shaking type dispersing machine for 3 hours. The solution obtained was applied onto an aluminum coated polyester film by a wire bar to form a charge generation layer 0.5 μm in dry thickness.

10 g of the hydrazone compound used in Example 15 as the charge transport material was dissolved in a polymer solution prepared by dissolving 10 g of polycarbonate resin into 90 g of cyclohexanone. The solution obtained was applied onto the charge generation layer by a wire bar to form a charge transport layer 17 μm in thickness. Thus, an electrophotographic photoreceptor was prepared.

The electrophotographic photoreceptor thus prepared was charged by corona discharge in −6 kV at a dark place and then exposed to monochromatic light at 780 nm at an intensity of illumination of 2.5 μW/cm$^2$ for 20 seconds, in order to examine the photoreceptor properties. Measured photoreceptor properties were intially charged potential $V_o$ after charging time $t_D$ necessary for dark-decaying from −620 V to −600 V in the surface potential, quantity of exposed light $E_{\frac{1}{2}}$ necessary for light-decaying from −600 V to −300 V and residual potential $V_r$ after light irradiation for 20 seconds. Furthermore, similar operations were repeated 1000 times as to the electrophotographic photoreceptor, and $V_o(1000)$, $t_D(1000)$, $E_{\frac{1}{2}}(1000)$ and $V_r(1000)$ after 1000 times were measured to evaluate durability. The photoreceptor properties are shown in Table 5. The spectral sensitivity properties were similar to the curve b in FIG. 7. It can be seen from curve b that the electrophotographic photoreceptor of the invention has a high sensitivity from the visible region to the infrared region.

Example 32

An electrophotographic photoreceptor was prepared under the conditions similar to Example 31, except that the α-form copper phthalocyanine composition was composed of 2 wt. % of copper tetranitrophthalocyanine (B) and copper phthalocyanine, and the following compound was used as the charge transport material. The photoreceptor properties are shown in Table 5.

The spectral sensitivity properties were similar to Example 31.

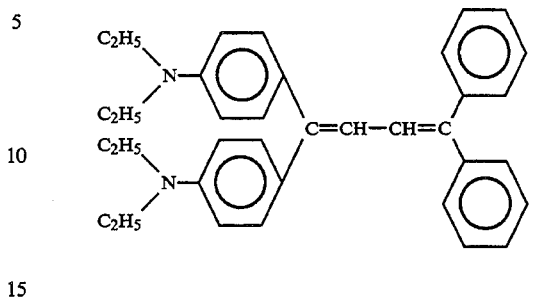

Example 33

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 400 g of diethylene glycol dimethyl ether in an ice bath. Thereafter, 100 g of water was gradually added to obtain a squarylium compound treated with sulfuric acid.

An electrophotographic photoreceptor was prepared under conditions similar to Example 31, except using the above squarylium compound. The photoreceptor properties are shown in Table 5. The spectral sensitivity properties were similar to the curve a in FIG. 7. It can be seen from curve a that the electrophotographic photoreceptor has a high sensitivity from the visible region to the infrared region, and its sensitivity is higher than Example 31.

Example 34

An electrophotographic photoreceptor was prepared under conditions similar to Example 31, except that the squarylium compound was prepared in Example 33 and the α-form copper phthalocyanine composition was composed of 2 wt. % of copper tetranitrophthalocyanine (B) and copper phthalocyanine. The photoreceptor properties are shown in Table 5. The spectral sensitivity properties were similar to Example 33.

Example 35

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into an aqueous diethylene glycol dimethyl ether solution prepared by mixing 400 g of diethylene glycol dimethyl ether and 100 g of water to prepare a squarylium compound treated with sulfuric acid.

Except using the above squarylium compound treated with sulfuric acid, an electrophotographic photoreceptor was prepared under the conditions similar to Example 31. The photoreceptor properties, and the spectral sensitivity properties were similar to Example 33.

Example 36

A squarylium compound was synthesized by heating squarylic acid and N,N-dimethylaniline in a solvent mixture of n-butanol and toluene, and dehydrated through azeotropic reaction. 1 g of the squarylium compound was added to 10 g of sulfuric acid, and the sulfuric acid solution was added dropwise into 500 g of water to prepare a squarylium compound treated with sulfuric acid.

Except using the above squarylium compound treated with sulfuric acid, an electrophotographic photoreceptor was prepared under the conditions similar to Example 31. The photoreceptor properties, and the spectral sensitivity properties were similar to Example 33.

TABLE 5

| Photoreceptor Properties | Example 31 | Example 32 | Example 33 | Example 34 |
|---|---|---|---|---|
| $V_o$ [V] | −752 | −759 | −758 | −770 |
| $t_D$ [sec.] | 11 | 14 | 16 | 14 |
| $E_{\frac{1}{2}}$ [μJ/cm$^2$] | 0.79 | 0.78 | 0.61 | 0.57 |
| $V_r$ [V] | −53 | −58 | −43 | −57 |
| $V_o$ (1000) [V] | −746 | −756 | −752 | −759 |
| $t_D$ (1000) [sec.] | 10 | 12 | 10 | 13 |
| $E_{\frac{1}{2}}$ (1000) [μJ/cm$^2$] | 0.72 | 0.75 | 0.64 | 0.55 |
| $V_r$ (1000) [V] | −55 | −56 | −50 | −64 |

Comparative Example 8

An electrophotographic photoreceptor was prepared under the conditions similar to Example 31, except that only an α-form copper phthalocyanine composition composed of 2 wt. % of copper tetranitrophthalocyanine (B) and copper phthalocyanine was used as the charge generation material. The spectral sensitivity properties are shown in FIG. 7 as curve c. It can be seen that the sensitivity lowers in wavelength regions of less than 550 nm and more than 750 nm. The photoreceptor properties were as follows:

$V_o = -793$ V $t_D = 16$ sec.

$E_{\frac{1}{2}} = 1.3$ μJ/cm$^2$ $V_r = -43$ V $V_o (1000) = -789$ V $t_D (1000) = 15$ sec.

$E_{\frac{1}{2}} (1000) = 1.5$ μJ/cm$^2$ $V_r (1000) = -52$ V

We claim:

1. An electrophotographic photoreceptor comprising an α-form copper phthalocyanine composition, which is obtained by treating a copper tetranitrophthalocyanine (A) having the formula I and copper phthalocyanine simultaneously to convert the crystalline form into α-form, and a photoconductive squarylium compound as the photoconductive material, the ratio of the copper tetranitrophthalocyanine (A) to the α-form copper phthalocyanine composition being 2 wt. % to 20 wt. %, and the ratio of the squarylium compound to the α-form copper phthalocyanine composition being 1 wt. % to 30 wt. %,

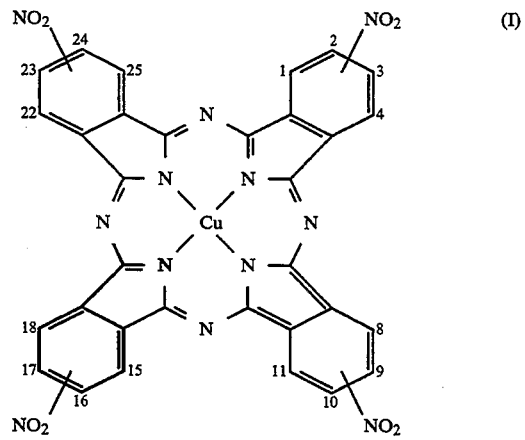

wherein in the formula, each nitro group is substituted at the 1-position or 4-position, 8-position or 11-position, 15-position or 18-position, and 22-position or 25-position, respectively and the copper tetranitrophthalocyanine is uniformly distributed throughout the α-form copper phthalocyanine crystals.

2. The electrophotographic photoreceptor of claim 1 wherein said treating is conducted by the acid pasting method.

3. The electrophotographic photoreceptor of claim 1 wherein the photoconductive squarylium compound has been treated with sulfuric acid by dissolving a photoconductive squarylium compound into sulfuric acid to obtain a sulfuric acid solution and adding water to the sulfuric acid soluion.

4. The electrophotographic photoreceptor of claim 1 wherein the photoconductive squarylium compound has been treated with sulfuric acid by dissolving a photoconductive squarylium compound into sulfuric acid to obtain a sulfuric acid solution, mixing the sulfuric acid solution with a water-soluble organic solvent which is inactive in sulfuric acid, and adding water to the mixture solution.

5. The electrophotographic photoreceptor of claim 1 wherein the photoconductive squarylium compound has been treated with sulfuric acid by dissolving a photoconductive squarylium compound into sulfuric acid to obtain a sulfuric acid solution, and mixing the sulfuric acid solution with an aqueous solution of a water-soluble organic solvent which is inactive in sulfuric acid.

6. The electrophotographic photoreceptor of claim 1, which comprises a photosensitive layer which is a single layer.

7. The electrophotographic photoreceptor of claim 1, which comprises two photosensitive layers, a lower photosensitive layer containing a pigment, and an upper photosensitive layer containing the α-form copper phthalocyanine composition and the photoconductive squarylium compound.

8. The electrophotographic photoreceptor of claim 1, which comprises a charge generation layer and a charge transport layer, and charge generation layer containing the α-form copper phthalocyanine composition and the photoconductive squarylium compound.

9. An electrophotographic photoreceptor comprising an α-form copper phthalocyanine composition, which is obtained by treating a copper tetranitrophthalocyanine (B) having the formula I and copper phthalocyanine simultaneously to convert the crystalline form into α- form, and a photoconductive squarylium compound as the photoconductive material, the ratio of the copper tetranitrophthalocyanine (B) to the α-form copper phthalocyanine composition being 1 wt. % to 10 wt. %, and the ratio of the squarylium compound to the α-form copper phthalocyanine composition being 1 wt. % to 30 wt. %,

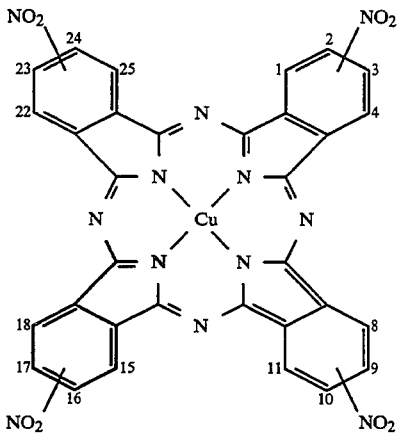

(I)

wherein in the formula, each nitro group is substituted at the 2-position or 3-position, 9-position or 10-position, 16-position or 17-position, and 23-position or 24-position, respectively and the copper tetranitrophthalocyanine is uniformly distributed throughout the α-form copper phthalocyanine crystals.

10. The electrophotographic photoreceptor of claim 9 wherein said treating is conducted by the acid pasting method.

11. The electrophotographic photoreceptor of claim 9 wherein the photoconductive squarylium compound has been treated with sulfuric acid by dissolving a photoconductive squarylium compound into sulfuric acid to obtain a sulfuric acid solution and adding water to the sulfuric acid soluion.

12. The electrophotographic photoreceptor of claim 9 wherein the photoconductive squarylium compound has been treated with sulfuric acid by dissolving a photoconductive squarylium compound into sulfuric acid to obtain a sulfuric acid solution, mixing the sulfuric acid solution with a water-soluble organic solvent which is inactive in sulfuric acid, and adding water to the mixture solution.

13. The electrophotographic photoreceptor of claim 9 wherein the photoconductive squarylium compound has been treated with sulfuric acid by dissolving a photoconductive squarylium compound into sulfuric acid to obtain a sulfuric acid solution, and mixing the sulfuric acid solution with an aqueous solution of a water-soluble organic solvent which is inactive in sulfuric acid.

14. The electrophotographic photoreceptor of claim 9, which comprises a photosensitive layer which is a single layer.

15. The electrophotographic photoreceptor of claim 9, which comprises two photosensitive layers, a lower photosensitive layer containing a pigment, and an upper photosensitive layer containing the α-form copper phthalocyanine composition and the photoconductive squarylium compound.

16. The electrophotographic photoreceptor of claim 9, which comprises a charge generation layer and a charge transport layer, the charge generation layer containing the α-form copper phthalocyanine composition and the photoconductive squarylium compound.

17. An electrophotographic photoreceptor comprising an α-form copper phthalocyanine composition, which is obtained by treating a copper tetranitrophthalocyanine (A) and a copper tetranitrophthalocyanine (B) having the formula I and copper phthalocyanine simultaneously to convert the crystalline form into α-form, and a photoconductive squarylium compound as the photoconductive material, the ratio of the copper tetranitrophthalocyanine (A) to the α-form copper phthalocyanine composition being not more than 15 wt. %, the ratio of the copper tetranitrophthalocyanine (B) to the α-form copper phthalocyanine composition being not more than 8 wt. %, the ratio of the sum of the copper tetranitrophthalocyanine (A) and the copper tetranitrophthalocyanine (B) to the α-form copper phthalocyanine composition being not more than 20 wt. % and the ratio of the squarylium compound to the α-form copper phthalocyanine composition being 1 wt. % to 30 wt. %,

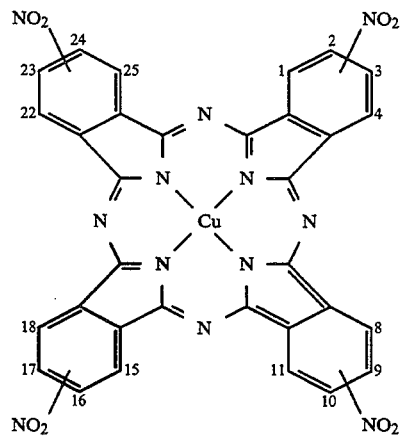

(I)

wherein in the formula, in the copper tetranitrophthalocyanine (A), each nitro group is substituted at the 1-position or 4-position, 8-position or 11-position, 15-position or 18-position, and 22-position or 25-position, respectively, and in the copper tetranitrophthalocyanine (B), each nitro group is substituted at the 2-position or 3-position, 9-position or 10-position, 16-position or 17-position, and 23-position or 24-position, respectively and the copper tetranitrophthalocyanine (A) and (B) are uniformly distributed throughout the α-form copper phthalocyanine crystals.

18. The electrophotographic photoreceptor of claim 17 wherein said treating is conducted by the acid pasting method.

19. The electrophotographic photoreceptor of claim 17 wherein the photoconductive squarylium compound has been treated with sulfuric acid by dissolving a photoconductive squarylium compound into sulfuric acid to obtain a sulfuric acid solution and adding water to the sulfuric acid soluion.

20. The electrophotographic photoreceptor of claim 17 wherein the photoconductive squarylium compound has been treated with sulfuric acid by dissolving a photoconductive squarylium compound into sulfuric acid to obtain a sulfuric acid solution, mixing the sulfuric acid solution with a water-soluble organic solvent which is inactive in sulfuric acid, and adding water to the mixture solution.

21. The electrophotographic photoreceptor of claim 17 wherein the photoconductive squarylium compound has been treated with sulfuric acid by dissolving a photoconductive squarylium compound into sulfuric acid to obtain a sulfuric acid solution, and mixing the sulfuric acid solution with an aqueous solution of a water-soluble organic solvent which is inactive in sulfuric acid.

22. The electrophotographic photoreceptor of claim 17, which comprises a photosensitive layer which is a single layer.

23. The electrophotographic photoreceptor of claim 17, which comprises two photosensitive layers, a lower photosensitive layer containing a pigment, and a upper photosensitive layer containing the α-form copper phthalocyanine composition and the photoconductive squarylium compound.

24. The electrophotographic photoreceptor of claim 17, which comprises a charge generation layer and a charge transport layer, the charge generation layer containing the α-form copper phthalocyanine composition and the photoconductive squarylium compound.

* * * * *

UNITED STATES PATENT AND TRADEMARK OFFICE
CERTIFICATE OF CORRECTION

PATENT NO. : 5,368,965
DATED : November 29, 1994
INVENTOR(S) : Mizue Fujimori et al It is certified that error appears in the above-indentified patent and that said Letters Patent is hereby corrected as shown below:

Column 22, line 34; change "soluion" to ---solution---.
Column 23, line 41; change "soluion" to ---solution---.
Column 24, line 60; change "soluion" to ---solution---.

Signed and Sealed this

Twenty-first Day of March, 1995

Attest:

BRUCE LEHMAN

*Attesting Officer*   *Commissioner of Patents and Trademarks*